United States Patent
Chen et al.

(10) Patent No.: US 6,646,752 B2
(45) Date of Patent: Nov. 11, 2003

(54) METHOD AND APPARATUS FOR MEASURING THICKNESS OF A THIN OXIDE LAYER

(75) Inventors: Pu Fang Chen, Taipei (TW); Tung Li Lee, Hsin-Chu (TW); Bing Huei Perng, Hsin-Chu (TW); Chao Po Leu, Hsinchu (TW)

(73) Assignee: Taiwan Semiconductor Manufacturing Co. Ltd, Hsin Chu (TW)

( * ) Notice: Subject to any disclaimer, the term of this patent is extended or adjusted under 35 U.S.C. 154(b) by 0 days.

(21) Appl. No.: 10/080,432

(22) Filed: Feb. 22, 2002

(65) Prior Publication Data

US 2003/0160972 A1 Aug. 28, 2003

(51) Int. Cl.[7] ........................ G01B 11/06; H01L 21/00
(52) U.S. Cl. ................ 356/630; 438/5; 438/7
(58) Field of Search ................ 356/630, 364–369; 250/559.27, 559.28; 438/14, 16, 18, 781; 257/350; 427/8

(56) References Cited

U.S. PATENT DOCUMENTS

| | | | |
|---|---|---|---|
| 5,028,565 A | * 7/1991 | Chang et al. | 437/192 |
| 5,724,145 A | * 3/1998 | Kondo et al. | 356/630 |
| 5,897,710 A | * 4/1999 | Sato et al. | 427/8 |
| 5,985,025 A | * 11/1999 | Celii et al. | 438/267 |
| 6,010,914 A | * 1/2000 | Shishiguchi | 438/14 |
| 6,331,890 B1 | * 12/2001 | Murumo et al. | 356/369 |
| 6,372,666 B1 | * 4/2002 | Ramos et al. | 438/781 |
| 6,459,126 B1 | * 10/2002 | Mogami et al. | 257/350 |

* cited by examiner

Primary Examiner—Frank G. Font
Assistant Examiner—Sang H. Nguyen
(74) Attorney, Agent, or Firm—Tung & Associates

(57) ABSTRACT

A method and an apparatus for measuring thicknesses of ultra-thin gate oxide layers are provided. In the method, a substrate that has a thin gate oxide layer formed on top is first heat treated at a temperature between about 400° C. and about 800° C. under a sub-atmospheric pressure for at least 10 seconds. The substrate is then immediately transferred, i.e., within 10 minutes, to a thickness measuring device for the accurate measurement of the thickness of the gate oxide layer. The apparatus can be provided by mounting a heating chamber juxtaposed to a thickness measuring device, such as an ellipsometer so that substrate can be immediately transferred therein between after a heat treatment step is completed. The heat treatment step of the present invention novel method is efficient in preventing the deposition of moisture and organic residue onto the surface of the thin gate oxide layer.

20 Claims, 2 Drawing Sheets

METHOD AND APPARATUS FOR MEASURING THICKNESS OF A THIN OXIDE LAYER

FIELD OF THE INVENTION

The present invention generally relates to a method and an apparatus for measuring the thickness of a thin film and more particularly, relates to a method and an apparatus for measuring the thickness of a thin gate oxide layer accurately before moisture and organic residue are deposited on the film to cause erroneous readings.

BACKGROUND OF THE INVENTION

In the fabrication process for semiconductor devices, the process of growing a gate oxide layer for insulating a gate is an important step. In ULSI fabrication, the thickness of the gate oxide layer grown has been reduced to less than 100 Å by using the 0.35 μm technology. The process control for growing such thin gate oxide layers is therefore more critical than those used in the 0.7 μm technology for growing gate oxide thicker than 200 Å. To grow the ultra-thin gate oxide layers, particle, organic and metal contaminations must be reduced in a super-clean room technology and with improved cleaning processes. It has been found that in order to improve the integrity of ultra-thin gate oxide layers, the surface of a silicon wafer must be free of native oxide or other contaminants.

When the fabrication technology progresses into 0.1 μm, the thickness of the gate oxide layer may well be under 50 Å. At such small thickness, the surface micro roughness at the $SiO_2$/Si interface also becomes an important factor on channel electron mobility as well as other gate oxide qualities, for instance, the breakdown voltage of the gate oxide layer. Different contaminants may cause different detrimental effects on the device reliability when the gate oxide integrity is in question. The problems are important since gate oxide quality is one of the critical steps that determine the yield, reliability and performance of a ULSI circuit. Problems that may occur due to roughness, impurity and contamination can be the result of insufficient cleaning technology, poorly controlled oxidation technology and how the silicon wafer was prepared. Although various cleaning processes have been developed to remove contaminants, an important consideration is to avoid contamination rather than to clean it up during processing.

The ultra-thin gate oxide layers used in ULSI devices can be formed by many different techniques. One of such techniques is a rapid thermal oxidation process for forming an ultra-thin gate oxide layer of 60~70 Å for a 0.25 μm technology, or a thickness of 40 Å or less for a 0.18 μm technology. In a rapid thermal oxidation process, the equipment for performing the oxidation is similar to that used in a rapid thermal processing technique so that a process chamber can rapidly increase the temperature of a wafer, rapidly changing various gas requirements in the chamber and achieving a high vacuum without causing contamination to the wafer surface. In a rapid thermal oxidation process, the gate oxide formation can be carried out at a temperature between 950° C. and 1200° C. with reasonable growth rates.

In order to accurately control the quality of the ultra-thin gate oxide layer formed, the thickness of the layer grown must be accurately monitored. The monitoring or measuring of the ultra-thin gate oxide thickness becomes more important as the film thickness becomes smaller with the 0.25 μm or the 0.18 μm technology. Since the gate oxide layer is transparent at such small thickness and is formed over a highly absorbing substrate of silicon, a technique of ellipsometry is frequently used to determine the film thickness. While ellipsometry is used to determine the thickness of thin transparent dielectric layers by utilizing a visible light source, semiconductor layers that are transparent only to infrared light source can also be measured by using infrared. It has been found that for very thin semiconductor layers, i.e., such as in the ultra-thin gate oxide layers, even visible light penetrates deep enough for useful ellipsometric measurements to be made.

The ellipsometry operates by the principle that when an incident beam is plane polarized, the two perpendicular components will have different amounts of phase shift during reflection and therefore different reflection coefficients. The ellipsometry is usually used for the measurement of films of a thickness that is less than one wavelength of the viewing light. When ellipsometry is used on greater thicknesses as an interferometry, multiple number of thickness may have the same ellipsometric data.

The basic arrangement of an ellipsometer optics 10 is shown in FIG. 1. The optics 10 includes a monochromatic light source 12, a filter 14, a polarizer 16, a quarter wave plate 18, a specimen holder 20, an analyzer 22 and a detector 24. The polarizer 16, the analyzer 22 and the quarter wave plate 18 can all be rotated independently and their angular position with respect to the instrument frame closely monitored. By using appropriate initial settings of the three optical elements, namely the analyzer, the polarizer and the quarter wave plate, and then rotating the quarter wave plate and the analyzer until a light transmission minimum is observed, the various parameters required for calculating the film thickness can be determined. When different light wavelengths is used for the measurement, different quarter wave plates 18 must be used since the thickness of the plate must be tailored to the specific wavelength.

While the ellipsometer shown in FIG. 1 generally provides a reliable technique for measuring the thickness of an ultra-thin gate oxide layer, problems in obtaining accurate measurements are frequently encountered which are not related to the ellipsometric technique. For instance, it has been observed that after an ultra-thin gate oxide layer, i.e., about 20 Å, is formed on a silicon wafer, the thickness measurement continuously increases with time. It has also been found that when ultra-thin gate oxide film of 20 Å is formed on a silicon wafer, the maximum deviation measured from its supposed thickness is about 0.4 Å, or about a 2% deviation. It is therefore impossible to measure the real thickness of the ultra-thin gate oxide layer by the traditional ellipsometric technique when the thickness measured is time dependent.

In modern IC devices where the thickness of a gate oxide layer is extremely small, i.e., between about 20 Å and about 50 Å, the measurement problem presents a serious drawback in the quality control of the devices. The cause for the continuing thickness increase on the ultra-thin gate oxide layer has been attributed to moisture and organic residue absorption on the gate oxide film surface, instead of any further oxide growth. The traditional ellipsometer therefore cannot be reliably used to monitor the thickness of an ultra-thin gate oxide layer.

A typical time-dependent measurement curve obtained on an ultra-thin gate oxide layer by a conventional ellipsometer is shown in FIG. 2. Data plotted in FIG. 2 are obtained in three separate tests on similar samples. It is seen that within the first 6 hours of deposition, thicknesses measured by the ellipsometer increase continuously from about 19.8 Å to about 20.2 Å, resulting in a 0.4 Å increase, or approximately a 5% deviation from the original thickness measurement of 19.8. The film thickness further increases after 6 hours to approximately 20 hours, even though at a slower rate, to a final thickness of about 20.5 Å. Such variations in the thickness measurements cannot be tolerated for reliability reasons.

It is therefore an object of the present invention to provide a method for measuring a thickness of a thin film that does not have the drawbacks and shortcomings of a conventional measurement technique.

It is another object of the present invention to provide a method for measuring a thickness of a thin film that has a surface sensitive to moisture or organic residue.

It is a further object of the present invention to provide a method for measuring a thickness of a thin film by a modified ellipsometric technique.

It is another further object of the present invention to provide a method for measuring a thickness of a thin film that has a surface sensitive to moisture and organic residue by first heating the thin film and evacuating an enclosure wherein the thin film is situated to a temperature between about 400° C. and about 800° C., and to a sub-atmospheric pressure.

It is still another object of the present invention to provide a method for measuring a thickness of a thin film of less than 50 Å wherein the film has a surface sensitive to moisture and organic residue.

It is yet another object of the present invention to provide an apparatus for measuring a thickness of a thin film that has a surface sensitive to moisture and organic residue by providing a heating chamber connected to a thickness measuring device wherein the heating chamber can be evacuated to form a vacuum therein.

It is still another further object of the present invention to provide an apparatus for measuring thickness of a thin film that has a surface sensitive to moisture and organic residue by providing a heating chamber capable of heating a film to a temperature between about 400° C. and about 800° C. at a sub-atmospheric pressure.

It is yet another further object of the present invention to provide a method for measuring a thickness of a gate oxide layer not thicker than 100 Å by an ellipsometer which includes the step of first heat treating the gate oxide layer to a temperature not higher than 800° C. in a chamber at a pressure of not higher than 760 Torr for at least 10 seconds.

SUMMARY OF THE INVENTION

In accordance with the present invention, a method and an apparatus for measuring a thickness of a thin oxide layer that are capable of producing accurate results are provided.

In a preferred embodiment, a method for measuring thickness of a thin film layer that has a surface sensitive to moisture and organic residue can be carried out by the operating steps of positioning a substrate that has a film layer thereon in a vacuum heating chamber, heating the substrate and the film layer to a temperature between about 400° C. and about 800° C. under a pressure of less than 760 Torr for at least 10 seconds in the vacuum heating chamber, positioning the substrate in a thickness measuring device within 10 minutes after removal from the vacuum heating chamber, and measuring a thickness of the film layer.

In the method for measuring a thickness of a thin film layer that has a surface sensitive to moisture and organic residue, the film layer may have a thickness less than 50 Å, and preferably a thickness less than 25 Å. The film layer may be a gate oxide layer that has a thickness of less than 50 Å. The heating step may be carried out at a temperature of at least 500° C. for a time period of at least 20 seconds. The method may further include the step of measuring the thickness of the film layer by a ellipsometer. The method may further include the step of transporting a substrate from a vacuum heating chamber to a thickness measuring device through an interior passageway of a conduit isolated from the atmosphere. The method may be a real time thickness measuring technique.

The present invention is further directed to an apparatus for measuring thickness of a thin film that has a surface sensitive to moisture and organic residue which includes a heating chamber capable of providing a temperature between about 400° C. and about 800° C. at a sub-atmospheric pressure, and a thickness measuring device positioned juxtaposed to the heating chamber such that a substrate heat treated in the heating chamber may be transported into the thickness measuring device within 10 minutes after completion of a heat treatment step in the heating chamber.

The apparatus for measuring a thickness of a thin film that has a surface sensitive to moisture and organic residue may further include a conduit connecting and providing fluid communication between the heating chamber and the thickness measuring device such that a substrate may be transported from the heating chamber to the thickness measuring device isolated from the atmosphere. The apparatus may further include an air evacuation means in fluid communication with a cavity in the heating chamber for reducing a pressure in the cavity to less than 760 Torr. The substrate may be a silicon wafer that has a less than 50 Å thick gate oxide layer formed on top. The thickness measuring device may be an ellipsometer. The apparatus is effective in transporting the film and the substrate into a thickness measuring device substantially without moisture and organic residue formed on top.

In an alternate embodiment, the present invention is directed to a method for measuring a thickness of a gate oxide layer not thicker than 100 Å by an ellipsometer which can be carried out by the operating steps of positioning a silicon wafer that has a gate oxide layer formed on top in a chamber, the gate oxide layer may have a thickness less than 100 Å, heat treating the silicon wafer to a temperature not higher than 800° C. in the chamber at a pressure less than 760 Torr for at least 10 seconds, transporting the silicon wafer to an ellipsometer within 10 minutes after removal from the chamber, and measuring a thickness of the gate oxide layer prior to deposition of moisture and organic residue on the gate oxide layer.

The method for measuring a thickness of a gate oxide layer not thicker than 100 Å by an ellipsometer may further include the step of transporting the silicon wafer through a passageway in a conduit that is substantially isolated from the atmosphere. The gate oxide layer may have a thickness less than 50 Å. The method may further include the step of heat treating the silicon wafer to a temperature of between about 500° C. and about 700° C. for at least 20 seconds. The method may further include the step of measuring a thickness of the gate oxide layer in real time. The method may further include the step of heat treating the silicon wafer to a temperature not higher than 650° C. and at a pressure not higher than 1 Torr.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENTS

The present invention discloses a method for measuring a thickness of a thin film layer that has a surface sensitive to moisture and organic residue. It also discloses an apparatus capable of performing accurate measurements on the thickness of a thin film such as an ultra-thin silicon oxide layer grown as a gate oxide in a semiconductor device.

In the method, a substrate that has a film layer formed on top is first positioned in a heating chamber that is capable of sustaining a sub-atmospheric pressure inside the chamber. The substrate and the film layer are then heated to a temperature between about 400° C. and about 800° C. under a sub-atmospheric pressure for at least 10 seconds, and preferably for at least 20 seconds. Within 10 minutes of the completion of the heat treatment step, the substrate and the film coating layer are placed in a thickness measuring device, such as an ellipsometer for measuring the thickness of the film layer. The present invention novel method is capable of making accurate measurement of an ultra-thin gate oxide layer on a silicon wafer with reproducible results by incorporating the heat treatment step prior to the measurement step. The method is capable of making thickness measurement of any thin film layer that may have a surface sensitive to moisture or other organic contaminants as thin as 20 Å.

The present invention apparatus is constructed by mounting a heating chamber immediately adjacent to a thickness measuring device such that after a substrate that has a thin film formed thereon is heat treated in the heating chamber under a sub-atmospheric pressure (or under a high vacuum), the substrate can be immediately transported to the thickness measuring device prior to the surface of the substrate being deposited with moisture or other organic contaminants resulting in a continuous growth of the thin film The thickness measuring device utilized may be advantageously an ellipsometer which is effective in measuring thicknesses of thin dielectric material layers formed on a silicon substrate.

Figure 1:
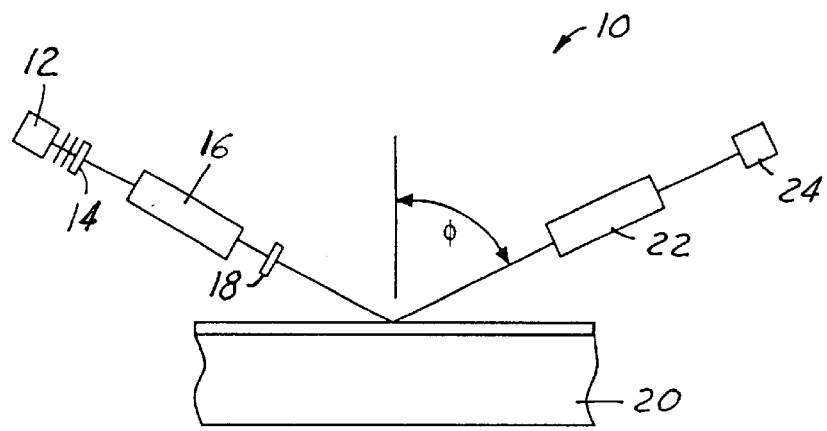
FIG. 1 is an illustration of the optical arrangement of a conventional ellipsometer.
Figure 2:
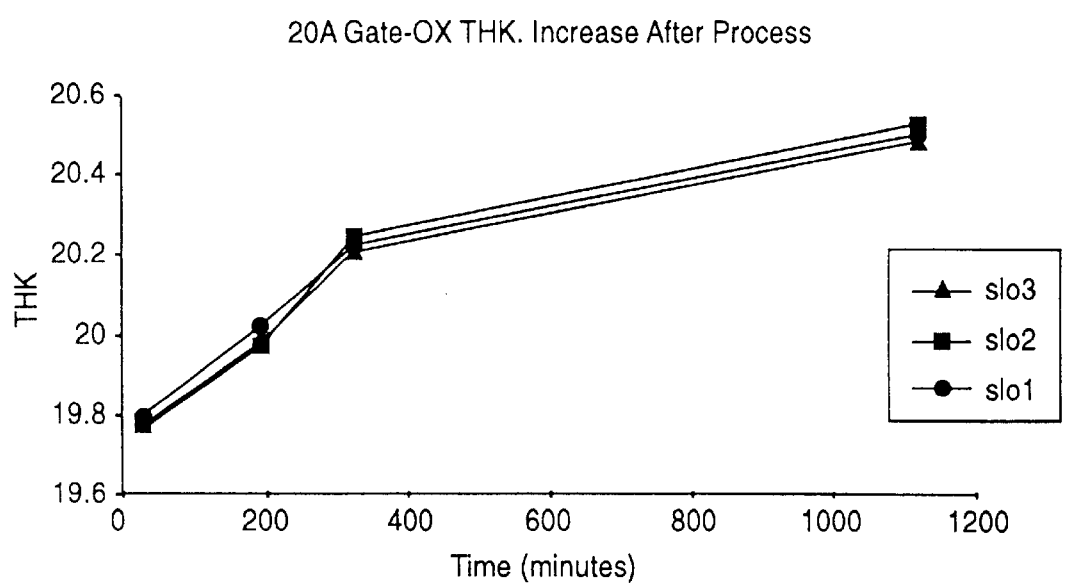
FIG. 2 is a graph illustrating the continuous thickness growth of an ultra-thin gate oxide layer caused by moisture and organic residue contamination.
Figure 3:
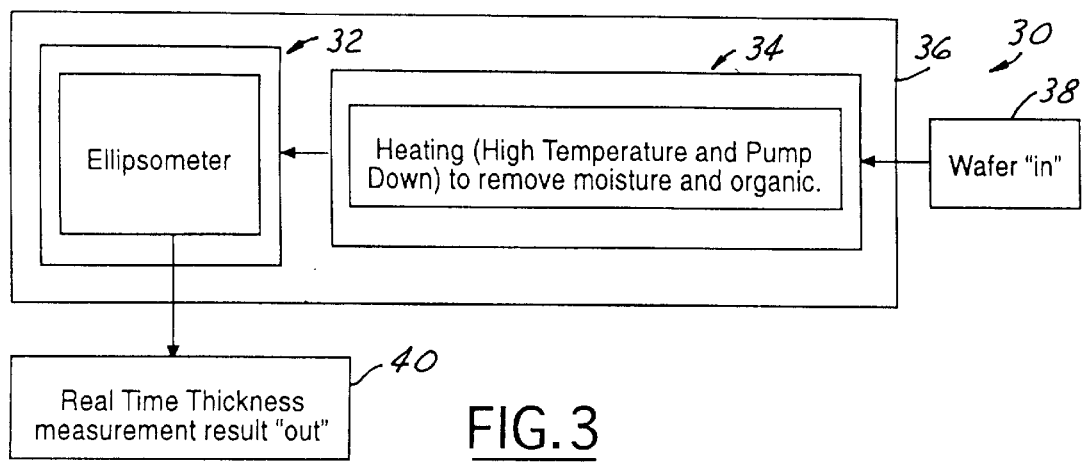
FIG. 3 is a graph illustrating an arrangement of the present invention apparatus of an ellipsometer mounted juxtaposed to a vacuum heating chamber.

FIG. 3 is an illustration of the present invention novel apparatus 30 which consists of an ellipsometer 32 and a heating chamber 34. The ellipsometer 32 utilized may be one of the commercially available instruments that is modified to be mounted juxtaposed to the heating chamber 34. It is desirable that the ellipsometer 32 and the heating chamber 34 are mounted immediately adjacent to each other such that a substrate may enter the ellipsometer immediately after the completion of the heat treatment step performed in the heating chamber 34. In any event, it has been found that the transfer of the substrate from the heating chamber 34 into the ellipsometer 32 should be completed within 10 minutes such that the chances of moisture and organic contaminants depositing on the surface of the substrate can be minimized or eliminated.

In another embodiment, a conduit may be provided in connecting and providing fluid communication between an input port of the ellipsometer 32 and an output port of the heating chamber 34 such that the substrate may be transported in a passageway connecting therein between isolated from the atmosphere. This is desirable since the substrate can then be completely isolated from the atmosphere, i.e., from the moisture and organic contaminants that are present in the atmosphere.

In another embodiment, as shown in FIG. 3, the ellipsometer 32 and the heating chamber 34 may be enclosed in a mini-environment 36 which encloses both instruments 32, 34 and thus isolating both from the atmosphere. The mini-environment can be advantageously filled with nitrogen or any other inert gases for achieving an inert and clean environment. FIG. 3 further shows a wafer storage facility 38 such as a SMIF pod or similar wafer storage enclosures. A data receiver/analyzer 40 is further shown in FIG. 3 for receiving data output on the thickness measurement from the ellipsometer 32.

Figure 4:
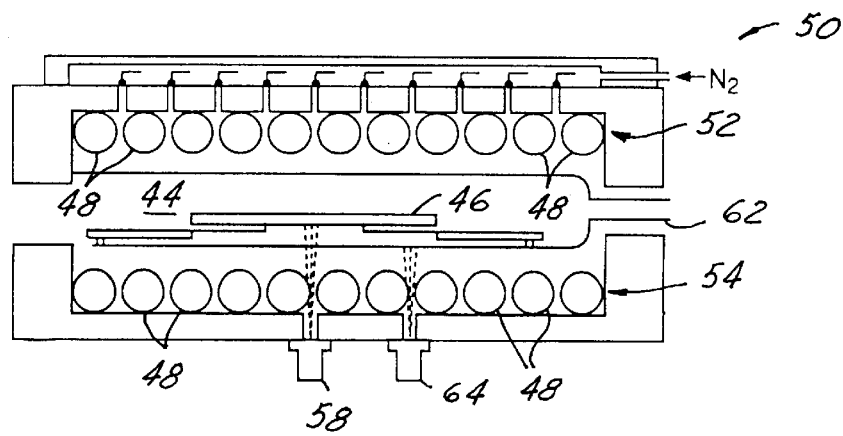
FIG. 4 is a cross-sectional view of a typical vacuum heating chamber suitable for use in the present invention apparatus.

Any type of rapid heating device can be utilized for the heating chamber 34 shown in FIG. 3. For instance, as shown in FIG. 4, an infrared lamp heated furnace 50 can be suitably used. The infrared lamp heated furnace 50 is constructed by an upper array 52 and a lower array 54 of heat sources each consisting of a plurality of infrared heating lamps 48. The heat source 52, 54 may also be suitably an array of halogen, silicon-carbide or arc lamps arranged in an optical reflective system. A single wafer 46 is isolated in the chamber cavity 44 and therefore, processed in a controlled environment. During the heat treating process, the wafer 46 can be rapidly heated from ambient temperature to a high heat treating temperature between about 400° C. and about 800° C. A suitable temperature is about 600° C. For the purpose of this write-up, the word "about" is used to mean a value of ±10% of the value given. It is desirable that the heating rate be controlled in a range from 10° C./sec to 500° C./sec. The rapid heating rate is made possible by the radiant heat from the heating lamps 48.

The temperature of wafer 46 can be monitored by an infrared pyrometer 58 from the backside of the wafer 46, for instance, at a wavelength of approximately 4 µm. The temperature of the quartz tube 62 is also monitored by a second infrared pyrometer 64 in a similar manner. An air evacuation means (not shown) is used to evacuate the chamber 44 to a sub-atmospheric pressure of less than 760 Torr, or to a high vacuum of less than 1 Torr pressure.

Figure 5:
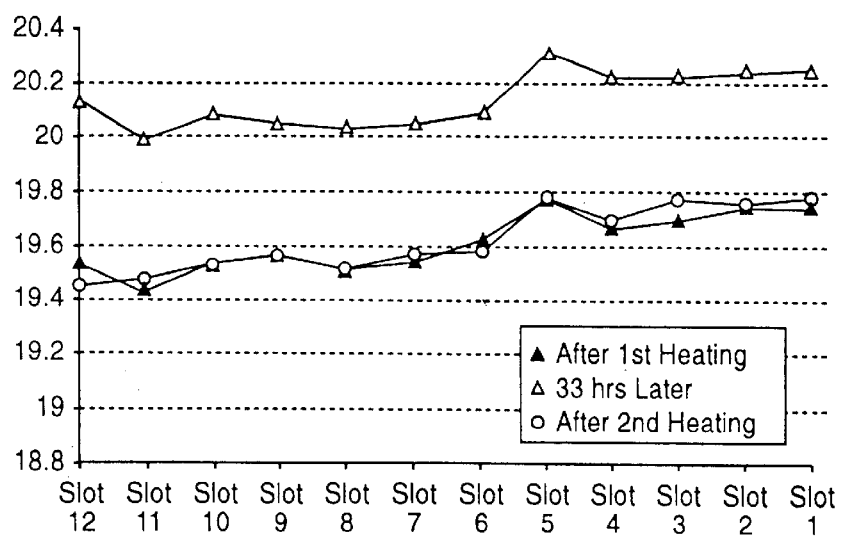
FIG. 5 is a graph illustrating the effect of the present invention method and apparatus in measuring thickness of an ultra-thin gate oxide layer.

FIG. 5 is a graph illustrating the desirable results achieved by the present invention novel method and apparatus 30. The data shown in FIG. 5 is obtained on tests conducted by first carrying out a 600° C./30 sec. heat treating step under vacuum on an ultra-thin gate oxide layer to remove the deposited moisture and organic residue. The gate oxide thickness is measured within 10 minutes after the heat treating step. These data is shown by the solid triangles or the bottom line in the graph. After a lapse of time of 33 hours, the thickness of the gate oxide film is measured again and plotted as the hollow triangles in FIG. 5, indicating that the thickness of the control wafer has increased by approximately 4.5 Å. A second heat treating step at 600° C./30 sec under vacuum is then carried out on the control wafer while data obtained are plotted in FIG. 5 as circles. It is observed that, after the second heat treating step, the thicknesses of the gate oxide film return to their initial values. The heat treatment under vacuum therefore makes it possible to obtain an accurate measurement of the thickness of the ultra-thin gate oxide layer.

The present invention novel method and apparatus for measuring thicknesses of ultra-thin gate oxide layers have therefore been amply described in the above descriptions and in the appended drawings of FIGS. 3~5.

While the present invention has been described in an illustrative manner, it should be understood that the terminology used is intended to be in a nature of words of description rather than of limitation.

Furthermore, while the present invention has been described in terms of a preferred and alternate embodiment, it is to be appreciated that those skilled in the art will readily apply these teachings to other possible variations of the inventions.

The embodiment of the invention in which an exclusive property or privilege is claimed are defined as follows:

1. A method for measuring a thickness of a thin film layer that has a surface sensitive to moisture and organic residue comprising the steps of:
   positioning a substrate having a film layer formed thereon in a vacuum heating chamber,
   heating said substrate and said film layer to a temperature between about 400° C. and about 800° C. under a pressure of less than 760 Torr in said vacuum heating chamber,
   positioning said substrate in a thickness measuring device within 10 min after removal from said vacuum heating chamber, and
   measuring a thickness of said film layer.

2. A method for measuring a thickness of a thin film layer that has a surface sensitive to moisture and organic residue according to claim 1, wherein said film layer has a thickness less than 50 Å.

3. A method for measuring a thickness of a thin film layer that has a surface sensitive to moisture and organic residue according to claim 1, wherein said film layer has a thickness less than 25 Å.

4. A method for measuring a thickness of a thin film layer that has a surface sensitive to moisture and organic residue according to claim 1, wherein said film layer is a gate oxide layer having a thickness of less than 50 Å.

5. A method for measuring a thickness of a thin film layer that has a surface sensitive to moisture and organic residue according to claim 1, wherein said heating step being carried out at a temperature of at least 500° C. for a time period of at least 10 sec.

6. A method for measuring a thickness of a thin film layer that has a surface sensitive to moisture and organic residue according to claim 1 further comprising the step of measuring the thickness of said film layer by a ellipsometer.

7. A method for measuring a thickness of a thin film layer that has a surface sensitive to moisture and organic residue according to claim 1 further comprising the step of transporting said substrate from said vacuum heating chamber to said thickness measuring device through an interior passageway of a conduit isolated from atmosphere.

8. A method for measuring a thickness of a thin film layer that has a surface sensitive to moisture and organic residue according to claim 1, wherein said method being a real time thickness measurement method.

9. An apparatus for measuring a thickness of a thin film having a surface sensitive to moisture and organic residue comprising:
   a heating chamber for providing a temperature between about 400° C. and about 800° C. at a sub-atmospheric pressure, and
   a thickness measuring device positioned juxtaposed to said heating chamber such that a substrate and a film heat treated in said heating chamber is transported into said thickness measuring device within 10 min after completion of said heat treatment step in said heating chamber.

10. An apparatus for measuring a thickness of a thin film having a surface sensitive to moisture and organic residue according to claim 9 further comprising a conduit connecting and providing fluid communication between said heating chamber and said thickness measuring device such that a substrate is transported from the former to the latter isolated from the atmosphere.

11. An apparatus for measuring a thickness of a thin film having a surface sensitive to moisture and organic residue according to claim 9 further comprising an air evacuation means in fluid communication with a cavity in said heating chamber for reducing a pressure in said cavity to less than 760 Torr.

12. An apparatus for measuring a thickness of a thin film having a surface sensitive to moisture and organic residue according to claim 9, wherein said substrate is a silicon wafer having a less than 50 Å thick gate oxide layer formed on top.

13. An apparatus for measuring a thickness of a thin film having a surface sensitive to moisture and organic residue according to claim 9, wherein said thickness measuring device is an ellipsometer.

14. An apparatus for measuring a thickness of a thin film having a surface sensitive to moisture and organic residue according to claim 9, wherein said apparatus being effective in transporting said film formed on said substrate into said thickness measuring device substantially without moisture and organic residue deposited on top of said film.

15. A method for measuring a thickness of a gate oxide layer not thicker than 100 Å by an ellipsometer comprising the steps of:
   positioning a silicon wafer having a gate oxide layer formed on top in a chamber, said gate oxide layer having a thickness less than 100 Å,
   heat treating said silicon wafer to a temperature not higher than 800° C. in said chamber at a pressure less than 760 Torr for at least 10 sec,
   transporting said silicon wafer to an ellipsometer within 10 min after removal from said chamber, and
   measuring a thickness of said gate oxide layer prior to deposition of moisture and organic contaminants on said gate oxide layer.

16. A method for measuring a thickness of a gate oxide layer not thicker than 100 Å by an ellipsometer according to claim 15 further comprising the step of transporting said silicon wafer through a passageway in a conduit that is substantially isolated from the atmosphere.

17. A method for measuring a thickness of a gate oxide layer not thicker than 100 Å by an ellipsometer according to claim 15, wherein said gate oxide layer having a thickness less than 50 Å.

18. A method for measuring a thickness of a gate oxide layer not thicker than 100 Å by an ellipsometer according to claim 15 further comprising the step of heat treating said silicon wafer to a temperature between about 500° C. and about 700° C. for at least 20 sec.

19. A method for measuring a thickness of a gate oxide layer not thicker than 100 Å by an ellipsometer according to claim 15 further comprising the step of measuring a thickness of said gate oxide layer in real time.

20. A method for measuring a thickness of a gate oxide layer not thicker than 100 Å by an ellipsometer according to claim 15 further comprising the step of heat treating said silicon wafer to a temperature not higher than 650° C. and at a pressure not higher than 1 Torr.

* * * * *